United States Patent [19]

Tammera

[11] Patent Number: 5,101,855
[45] Date of Patent: Apr. 7, 1992

[54] CYCLONE HAVING CIRCULAR TRICKLE VALVE ASSEMBLY

[75] Inventor: Robert F. Tammera, West Orange, N.J.

[73] Assignee: Exxon Research and Engineering Company, Florham Park, N.J.

[21] Appl. No.: 620,181

[22] Filed: Nov. 30, 1990

[51] Int. Cl.⁵ .................. F16K 15/03; F27B 15/02
[52] U.S. Cl. .................................. 137/527.8; 251/212
[58] Field of Search .................. 137/527, 527.6, 527.8; 251/212, 118, 127

[56] References Cited

U.S. PATENT DOCUMENTS

| | | | |
|---|---|---|---|
| 63,578 | 4/1867 | Taber | 137/527.8 X |
| 548,123 | 10/1895 | Hagins | 251/212 X |
| 1,359,161 | 11/1920 | Gardner | 222/505 |
| 1,850,589 | 3/1932 | Le Tourneau | 222/502 |
| 2,406,662 | 8/1946 | Burchett | 251/212 X |
| 2,679,335 | 5/1954 | Bell | 222/108 |
| 2,901,331 | 8/1959 | Held et al. | 137/527.8 X |
| 2,956,582 | 10/1960 | Pranter | 251/212 X |
| 3,784,360 | 1/1974 | Bunn et al. | 137/527.8 X |
| 3,826,624 | 7/1974 | Jones et al. | 137/527.8 X |
| 4,184,662 | 1/1980 | Feldman | 137/527.8 X |
| 4,262,825 | 4/1981 | Jacobson et al. | 222/503 |
| 4,270,716 | 6/1981 | Arnold | 222/58 |
| 4,527,647 | 7/1985 | Ueda | 222/77 X |
| 4,871,514 | 10/1989 | Ross | 137/527.8 X |
| 4,996,028 | 2/1991 | Danielsen et al. | 137/527.8 X |

Primary Examiner—John Rivell
Attorney, Agent, or Firm—Joseph J. Dvorak

[57] ABSTRACT

An improved cyclone trickle valve assembly is provided, which includes a cyclone that has a vertical dipleg having an inner cylindrical wall. An annular ring is horizontally disposed in the dipleg and is joined to the inner wall. Importantly, a pair of cooperably clamshell doors are positioned within the dipleg and are pivotably supported by the annular ring for mutual opposite swinging movement between a closed position wherein the doors adjoin along a midline, and an open position wherein the doors swing outwardly with respect to the midline, thereby substantially preventing gases from progressing upwardly through the dipleg above the annular ring when the clamshell doors are in a closed position and permitting solids to progress downwardly through the dipleg when the doors are in an open position.

8 Claims, 2 Drawing Sheets

CYCLONE HAVING CIRCULAR TRICKLE VALVE ASSEMBLY

FIELD OF THE INVENTION

This invention relates to trickle valves. More particularly, this invention relates to trickle valves used in fluid solids contacting zones and especially in dilute phase contacting zones.

BACKGROUND OF THE INVENTION

There are many chemical and petroleum processes in which solid particles of fluidizable size are suspended in a gas under conditions designed to promote catalytic and thermal reactions. One example of such a process is the fluidized catalytic cracking of petroleum. In this process, a petroleum feedstock is contacted with a solid catalyst at temperatures in the range of about 480° C. to about 800° C. In the past, the catalyst particles in a fluidized catalytic cracking process were maintained in a reactor in a dense fluidized state or bed. More recently, the trend has been to conduct fluidized catalytic cracking of petroleum without the maintenance of a dense fluidized bed of catalyst particles. Instead, the solid catalyst is suspended as a dilute phase in a fluid which is passed through the reactor vessel at sufficiently high velocities so that the reactants pass rapidly through the hydrocarbon conversion zone. This procedure reduces the residence time of the reactants in the hydrocarbon conversion zone to a predetermined time which is a function of catalyst activity, temperature, nature of the feed and the like. In effect, it permits use of high activity catalysts and higher temperatures than previously practical.

In all of these processes, fluid reactors, regenerators and similar vessels must be provided with means for separating the solid particles from the gaseous phase. Typically, this is accomplished by cyclones located in the upper part of the vessel. The solids separate from the gaseous fluid in the cyclones and are returned to the fluid solids contacting zone via a cyclone dipleg.

For cyclones to operate efficiently, it is necessary to prevent the ingress of fluidizing gas into the dipleg of the cyclone. Trickle valves have been used for this purpose. Basically, these consist of an angularly oriented conduit having one end operably connected to the dipleg of the cyclone and a hinged flapper or closure plate at the opposite end for opening and closing the conduit. Examples of these trickle valves can be found in U.S. Pat. No. 2,838,062; U.S. Pat. No. 2,838,065; U.S. Pat. No. 2,901,331; U.S. Pat. No. 3,826,624; U.S. Pat. No. 3,698,874; U.S. Pat. No. 4,074,691; U.S. Pat. No. 4,184,662; U.S. Pat. No. 4,246,231; and U.S. Pat. No. 4,446,107.

These references evidence the fact that satisfactory operation of trickle valves has always been a problem. Recent experience, moreover, has shown that achieving satisfactory performance of trickle valves in dilute phase fluid solids contacting zones is even more troublesome. Thus, it is an object of the present invention to provide an improved trickle valve. Indeed, it is an object of the present invention to provide an improved trickle valve suitable for use in fluid solids contacting zones, particularly dilute phase fluid contacting zones.

SUMMARY OF THE INVENTION

Accordingly, an improved cyclone trickle valve assembly is provided, which includes a cyclone that has a vertical dipleg having an inner cylindrical wall. An annular ring is horizontally disposed in the dipleg and is joined to the inner wall. Importantly, a pair of cooperable clamshell doors are positioned within the dipleg and are pivotably supported by the annular ring for mutual opposite swinging movement between a closed position wherein the doors adjoin along a midline, and an open position wherein the doors swing outwardly with respect to the midline, thereby substantially preventing gases from progressing upwardly through the dipleg above the annular ring when the clamshell doors are in a closed position and permitting solids to progress downwardly through the dipleg when the doors are in an open position.

In one embodiment of the present invention, a baffle is located in the dipleg above the annular ring to direct the flow of solids, under conditions of use, away from the annular ring and downwardly toward the clamshell doors. Preferably, the baffle has the shape of a truncated cone.

In another embodiment of the present invention, the cylindrical door shells are counterbalanced so as to permit them to tip at a maximum angle of 15° from the centerline of the dipleg under conditions of use.

Additional features and advantages of the trickle valve of the invention will become apparent upon a reading of the detailed description in light of the accompanying drawings.

DETAILED DESCRIPTION OF THE DRAWINGS

For convenience, the present invention will be described in particular detail with respect to a reactor containing a single cyclone having a valve of the present invention positioned within the dipleg of the cyclone. However, it will be readily appreciated that fluid solids contacting apparatus, like fluid catalytic cracking reactor units, contain a plurality of cyclones located within the vessel and the present invention is particularly suitable for use in those units and, in particular, in the cyclones located within those units.

Figure 1:
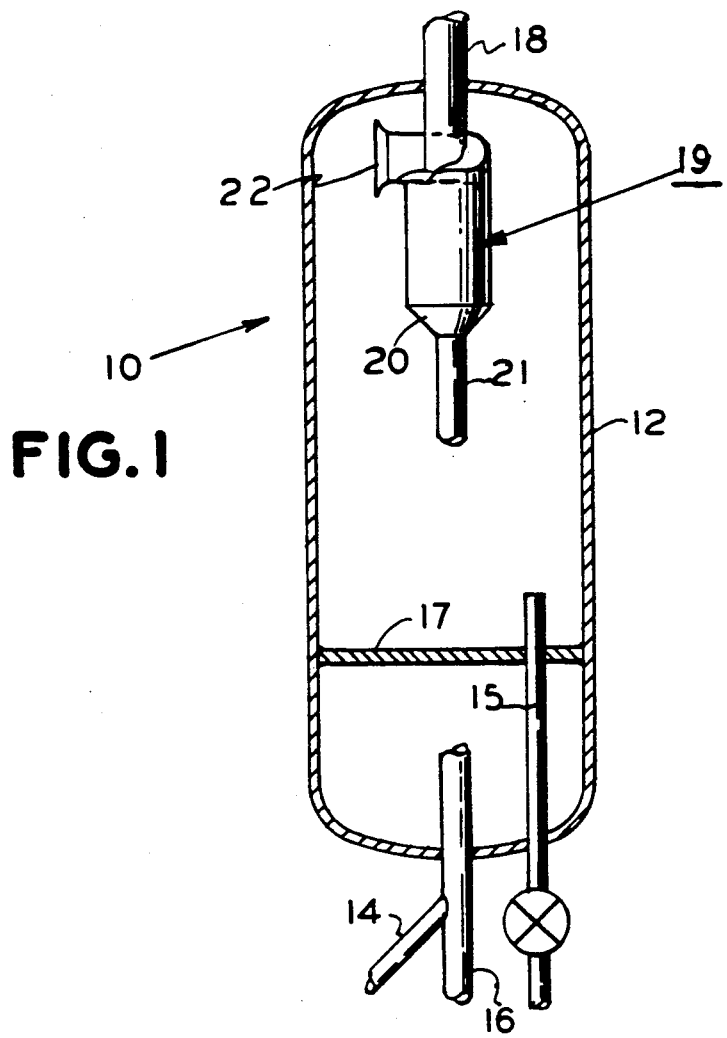
FIG. 1 is a vertical section of a vessel having a cyclone positioned within the vessel, which includes the improved cyclone trickle valve assembly of the present invention.

Referring initially to FIG. 1, a fluid solids contacting vessel 10 includes a shell 12 which is provided with an inlet 16 for introducing entrained solids, such as catalyst suspended in a fluidizing gas, into the bottom of vessel 10. A conduit 14 is also provided for introducing a fluid reactant into the bottom of vessel 10. Additional inlets as may be necessary can be provided. In the embodiment shown in FIG. 1, a distributor plate 17 is horizontally disposed in the vessel 10 above the inlet conduits 14 and 16 for uniformly distributing the reactants in the vessel. The distributor plate 17, however, is totally optional. It may be left out or other known distributing devices may be employed. Also shown in FIG. 1 is a conduit 15 for removal of solids from the vessel.

A gas outlet 18 is provided at the top of vessel 10. As can be seen, the gas outlet 18 is operably connected to a cyclone separator 19. The cyclone separator 19 includes a conical portion or transition piece 20 and a dipleg portion 21. As can be seen, the gas outlet 18 is operably connected to the cyclone 19. Additionally, the cyclone 19 has an inlet 22 for the entrained solids. The solids that enter through inlet 22 are separated from the entraining gas and returned to the vessel via dipleg 21. The gaseous material is removed from the vessel via conduit 18. The trickle valve of the present invention is located within the dipleg 21 near the lower extremity thereof. Thus, a section of the dipleg 21 extends below the trickle valve.

Figure 2:
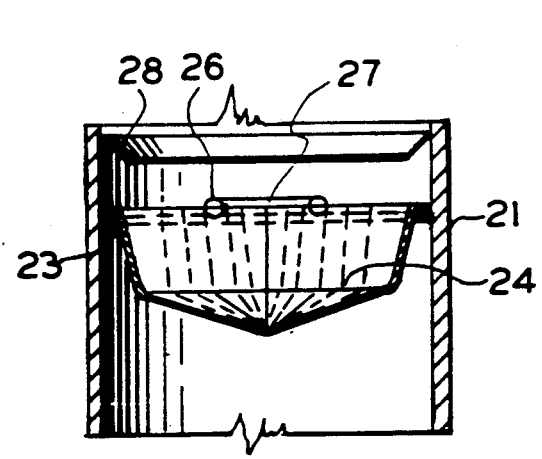
FIG. 2 is a vertical section of a cyclone dipleg showing the valve of the present invention in a closed position.
Figure 3:
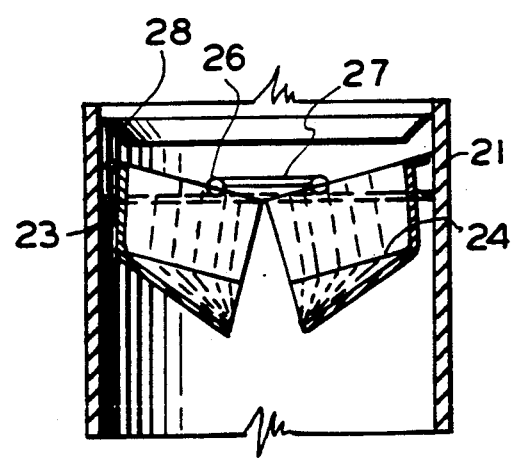
FIG. 3 is a vertical section of the cyclone dipleg showing the valve of the present invention in an open position.

Referring now to FIGS. 2 and 3, the trickle valve assembly of the present invention comprises a vertical, cylindrical, cyclone dipleg 21. An annular ring 23 is horizontally disposed within the dipleg 21 and joined to the inner wall of the dipleg 21. As can be seen in the figures, the annular ring 23 is relatively narrow so that the central opening defined by the annular ring has a diameter which is at least 75% of the diameter of the dipleg 21; for example, from about 75% to about 95% of the diameter of the dipleg 21 and, preferably, about 85% of the diameter of the dipleg 21.

The trickle valve assembly includes a pair of operable clamshell doors 24 which are pivotably supported by the annular ring 23 for mutual opposite swinging movement between a closed position (see FIG. 2), wherein the doors adjoin a midline, and an open position (see FIG. 3), wherein the doors swing outwardly with respect to the midline. Thus, when the doors are in a closed position, they prevent gases from progressing upwardly through the dipleg above the annular ring; and, when the doors are in an open position, they permit the solids to progress downwardly through the dipleg.

Figure 5:
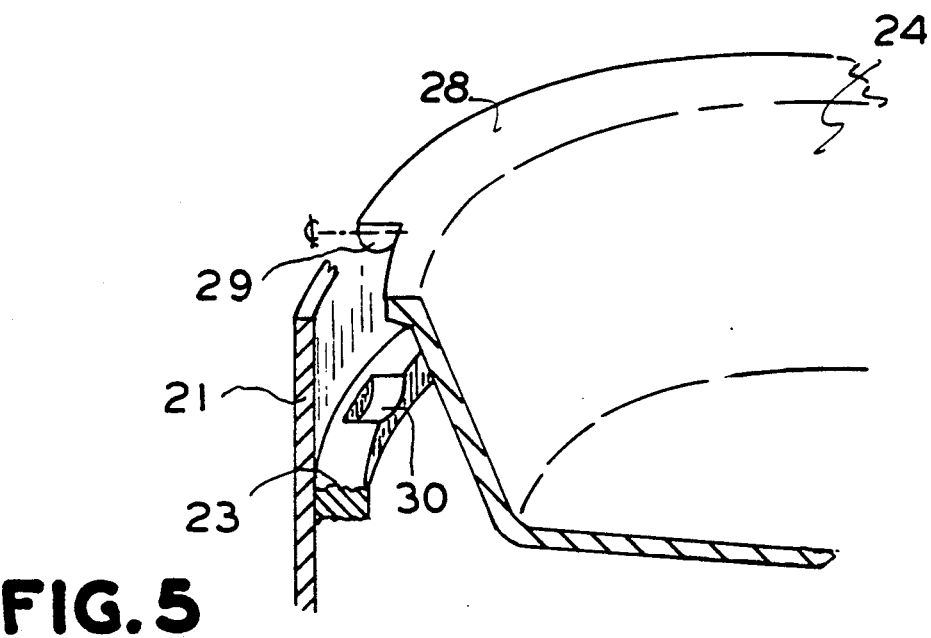
FIGS. 5 and 6 are fragmentary isometric views illustrating an alternate means for pivotably supporting the clamshell door.
Figure 6:
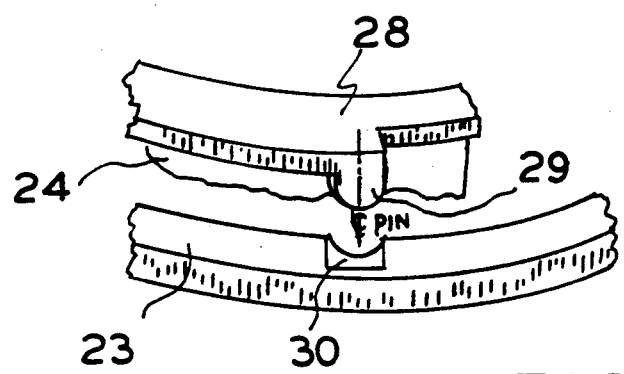

Optionally, but preferably, each door shell 24 has a semicircular lip 28 that extends radially outwardly from the top of the door shell so as to rest on annular ring 23 when the door is in a closed position. As can be seen in FIGS. 5 and 6, lip 28 is undercut in the region of the midline in an amount and for a distance sufficient to permit the door shell to swing outwardly with respect to the midline.

Figure 4:
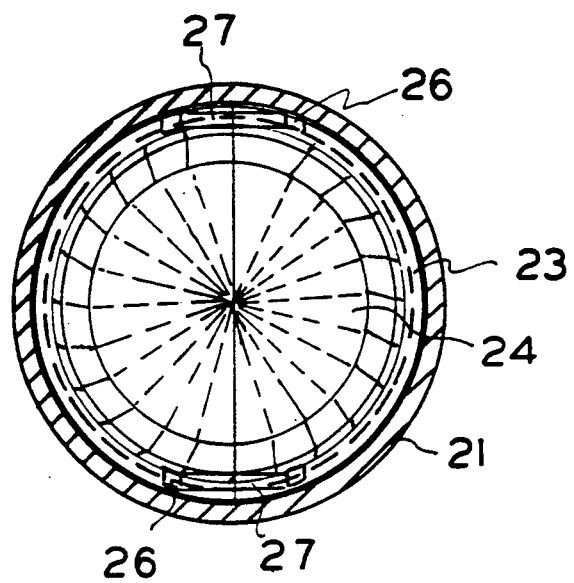
FIG. 4 is a top plan view along lines A—A of FIG. 2.

In one embodiment of the present invention, the clamshell doors 24 are pivotably mounted by means of roller pins 26. As shown in FIGS. 2, 3 and 4, there are two roller pins for each door shell. The roller pins are mounted on the annular ring 23 via a roller pin keeper 27.

In a preferred embodiment of the present invention, shown in FIGS. 5 and 6, the clamshell door 24 is pivotably mounted on ring 23 by a pair of opposed rounded nobs 29 extending downwardly from lip 28 and adapted to be received for pivotable movement in cooperating troughs 30 in annular ring 23.

In another embodiment of the present invention, the clamshell doors 24 are sized and balanced to permit them to tip a maximum of 15° from the centerline of the dipleg 21. Optionally, weights may be attached to each of the clamshell doors 24 in a strategic location, such as on the underside of the door, to provide optimum balancing of the doors thereby optimizing the operating characteristics of the valve assembly.

In the practice of the present invention, it is preferred that the valve assembly be located within the lower section of the dipleg; for example, from about the midpoint downward. Preferably, the valve assembly will be located within the lower section of the dipleg at a point sufficient to have at least a portion of the dipleg extend below the lowermost extremity of the clamshell doors. Optionally, the trickle valve may be located at the end of the dipleg, in which event a conduit or pipe will be added to the assembly so as to provide some protection of the door shells from the fluidized solids within the reactor.

Another feature of the present invention, as shown in FIGS. 2 and 3, is the inclusion of a baffle means 30 above ring 23 to direct the flow of solids away from ring 23 and downwardly toward the central region of the clamshell doors 24. Indeed, it is preferred that this baffle means has a shape of a truncated cone.

What is claimed is:

1. A cyclone trickle valve assembly comprising:
   a cyclone including a vertical dipleg having an inner cylindrical wall;
   an annular ring horizontally disposed in the dipleg and joined to the inner wall thereof, the ring having a central opening therein;
   a pair of cooperable clamshell doors positioned in the central opening of and pivotably supported by the annular ring for mutual opposite swinging movement between a closed position where the doors adjoin along a midline and an open position where the doors swing outwardly with respect to the midline, thereby substantially preventing gases from progressing upwardly through the dipleg above the annular ring when the doors are in a closed position and permitting solids to progress downwardly through the dipleg when the doors are in an open position, each of the clamshell doors having a semi-circular lip extending radially outwardly from the top end so as to rest on the annular ring when the doors are in a closed position and wherein the semi-circular lip is undercut in an amount and for a distance sufficient to permit the doors to swing outwardly with respect to the midline.

2. The valve assembly of claim 1 wherein the clamshell doors are pivotably supported by the annular ring by balance pins.

3. The valve assembly of claim 1 wherein each of the clamshell doors is pivotably supported on the annular ring by a pair of rounded nubs extending downwardly from the semicircular lip and wherein the annular ring includes four troughs adapted to receive the nubs.

4. The valve assembly of claim 1 wherein the door shells are balanced to permit them to tip a maximum of 15° from the centerline of the dipleg.

5. The valve assembly of claim 1 including baffle means located above the annular ring to direct the flow of solids, under conditions of use, away from the ring and downwardly toward the central region within the doors.

6. The valve of claim 5 wherein the baffle means extends downwardly and inwardly from the dipleg.

7. A cyclone trickle valve assembly comprising:
   a cyclone including a vertical dipleg having an inner cylindrical wall;
   an annular ring horizontally disposed in the dipleg and joined to the inner wall thereof, the ring having a central opening therein;

a pair of cooperable clamshell doors positioned in the central opening of and pivotably supported by the annular ring for mutual opposite swinging movement between a closed position where the doors adjoin along a midline and an open position where the doors swing outwardly with respect to the midline, thereby substantially preventing gases from progressing upwardly through the dipleg above the annular ring when the doors are in a closed position and permitting solids to progress downwardly through the dipleg when the doors are in an open position, each of the clamshell doors having a semicircular top end and a lip extending radially outwardly from the top end so as to rest on the annular ring when the doors are in a closed position and wherein the semicircular lip is undercut in an amount and for a distance sufficient to permit the doors to swing outwardly with respect to the midline; and, baffle means located above the annular ring to direct the flow of solids, under conditions of use, away from the ring and downwardly toward a central region within the doors.

8. The valve assembly of claim 7 wherein the door shells are balanced to permit them to tip a maximum of 15° from the centerline of the dipleg.

* * * * *